United States Patent [19]
Bowen et al.

[11] 3,773,128
[45] Nov. 20, 1973

[54] MODULAR FINAL DRIVE FOR A TRACK-TYPE VEHICLE

[75] Inventors: Harry H. Bowen, Pekin; Lawrence F. Clancy, Peoria; Stanley A. Jorgensen, Oswego, all of Ill.

[73] Assignee: Caterpillar Tractor Co., Peoria, Ill.

[22] Filed: Apr. 3, 1972

[21] Appl. No.: 240,734

[52] U.S. Cl.............. 180/6.48, 180/6.58, 180/9.62, 305/28
[51] Int. Cl............................................ B62d 11/04
[58] Field of Search.................. 180/6.48, 6.58, 6.7, 180/9.2 R, 9.62, 9.64; 305/28

[56] References Cited
UNITED STATES PATENTS

| | | | |
|---|---|---|---|
| 3,480,097 | 11/1969 | Solokhin et al...................... | 180/6.48 |
| 1,879,218 | 9/1932 | Hanson............................... | 180/6.58 |
| 1,317,103 | 9/1919 | Rimailho............................. | 180/9.62 |
| 3,494,439 | 2/1970 | Kline.................................. | 180/6.48 |
| 2,344,730 | 3/1944 | Ramsey................................ | 180/9.2 |
| 3,074,499 | 1/1963 | Bertelsen ........................... | 180/9.62 |
| 2,994,393 | 8/1961 | Whaley................................ | 180/6.48 |
| 3,416,623 | 12/1968 | Boone................................. | 180/6.48 |

FOREIGN PATENTS OR APPLICATIONS

| | | | |
|---|---|---|---|
| 604,334 | 7/1948 | Great Britain...................... | 180/9.62 |

*Primary Examiner*—Benjamin Hersh
*Assistant Examiner*—Leslie J. Paperner
*Attorney*—Paul S. Lempio et al.

[57] ABSTRACT

A modular final drive for a track-type vehicle includes a housing containing a speed reduction gear train which drives a track engaging sprocket. The housing is detachably mounted solely on the rearward end of a track roller frame to facilitate expeditious assembly and servicing.

8 Claims, 4 Drawing Figures

MODULAR FINAL DRIVE FOR A TRACK-TYPE VEHICLE

BACKGROUND OF THE INVENTION

Conventional track-type vehicles oftentimes employ a pair of final drive gear cases which are individually attached to a large central housing, commonly known as a bevel gear case. Consequently, servicing of the final drive gear train usually requires the disassembly of a plurality of individual housing components. Servicing thus becomes tedious, onerous and time-consuming and is most conveniently accomplished in a repair shop, which results in excessive down-time, particularly when the vehicle is transported an appreciable distance from the job site to the shop.

Occasionally field servicing is necessitated which gives rise to serious problems due to the inaccessibility of the final drive unit, located beneath the vehicle, and by adverse weather conditions which are frequently encountered. Furthermore, when a new part is needed the machine often remains idle for a considerable period of time. Access to the final drive unit and attendant components is further complicated by the location of the operator station, fuel tank, hydraulic components and other structures which are normally situated immediately above the final drive housing.

A track-type hydraulic excavator normally has its final drive housing welded or otherwise integrally formed with its associated track roller frame. Since the undercarriage directly supports the excavator's superstructure, containing the operator station, engine and earthworking equipment, the inner portion of the final drive housing must be separated to service the internal components, thus exposing them to dirt and possible damage. Accordingly, in view of the relatively inaccessible location of such housing, the same problems as discussed above are similarly experienced with these types of vehicles.

SUMMARY AND OBJECTS OF THE INVENTION

Accordingly, an object of this invention is to provide a modular final drive for a track-type vehicle adapted for convenient removal as a unit from a track roller frame for independent servicing.

Another object of this invention is to provide a modular final drive which can be serviced or replaced as a unit without exposing internal components thereof to a dirt-laden environment and damage and without having to remove attendant major components of the vehicle.

Another object of this invention is to provide a modular final drive which carries a track roller thereon to position such track roller in close proximity to a track drive sprocket.

Other objects and advantages of this invention will become apparent with reference to the accompanying drawings and following description.

DESCRIPTION OF THE PREFERRED EMBODIMENT

Figure 1:
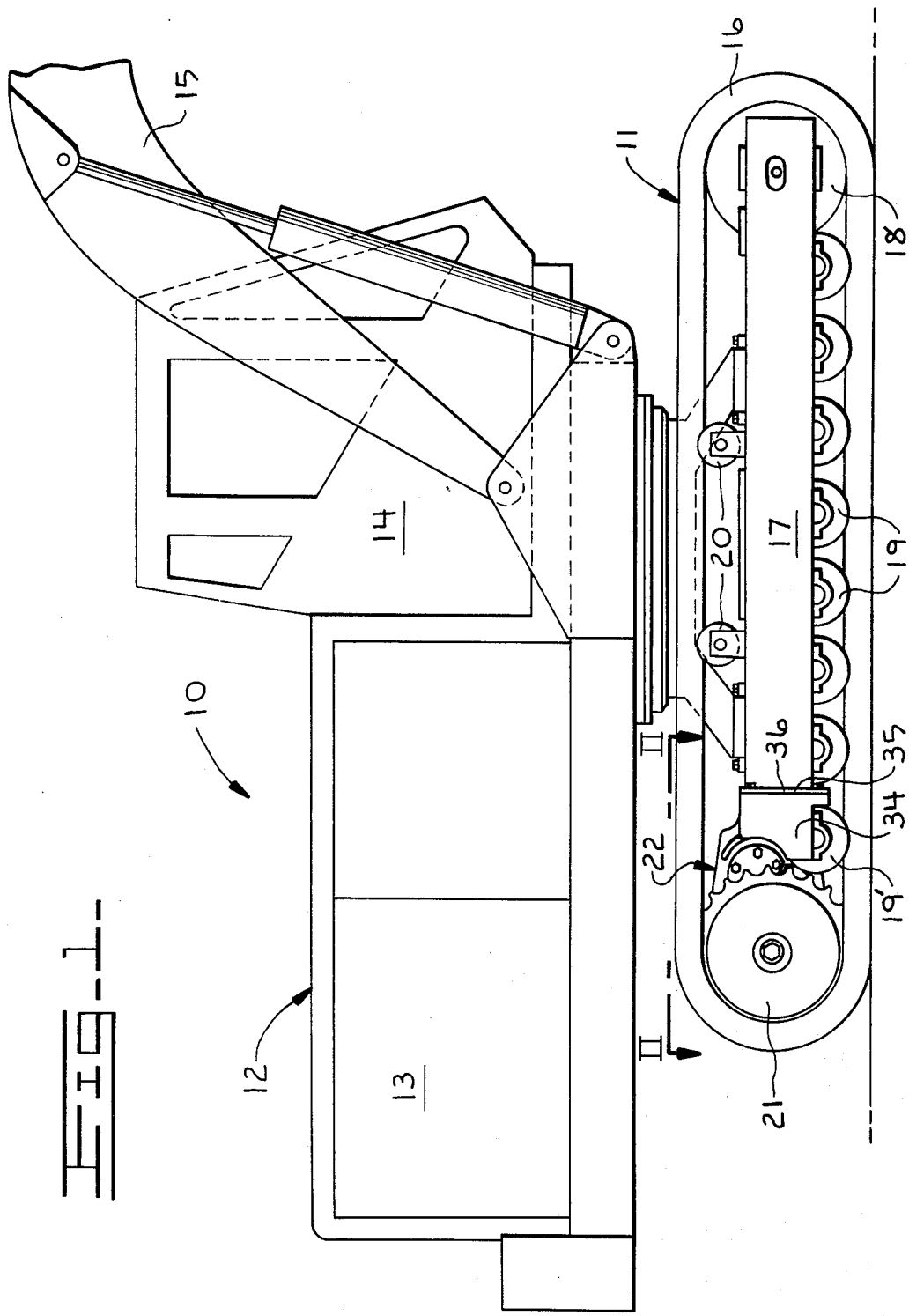
FIG. 1 is a partial, side elevational view of a hydraulic excavator having a modular final track drive of this invention removably mounted therein.

Referring to FIG. 1, a hydraulic excavator 10, disposed for movement along a longitudinal axis thereof, comprises a mobile undercarriage 11 having an upper unit 12 rotatably mounted thereon. The upper unit comprises a power plant 13, an operator's station 14 and an implement mounting boom 15. The undercarriage comprises a pair of laterally spaced and parallel endless track assemblies 16 (one shown) suitably mounted on a track frame 17 by an idler 18, track rollers 19, track support rollers 20 and a bull wheel or drive sprocket 21 of the final drive means or track drive 22 of this invention. The herein described track drive and associated track assembly is duplicated on the opposite side of the excavator. Although such track drive is herein described in association with the illustrated hydraulic excavator, it should be understood that such track drive has application to other types of track-type vehicles.

Figure 2:
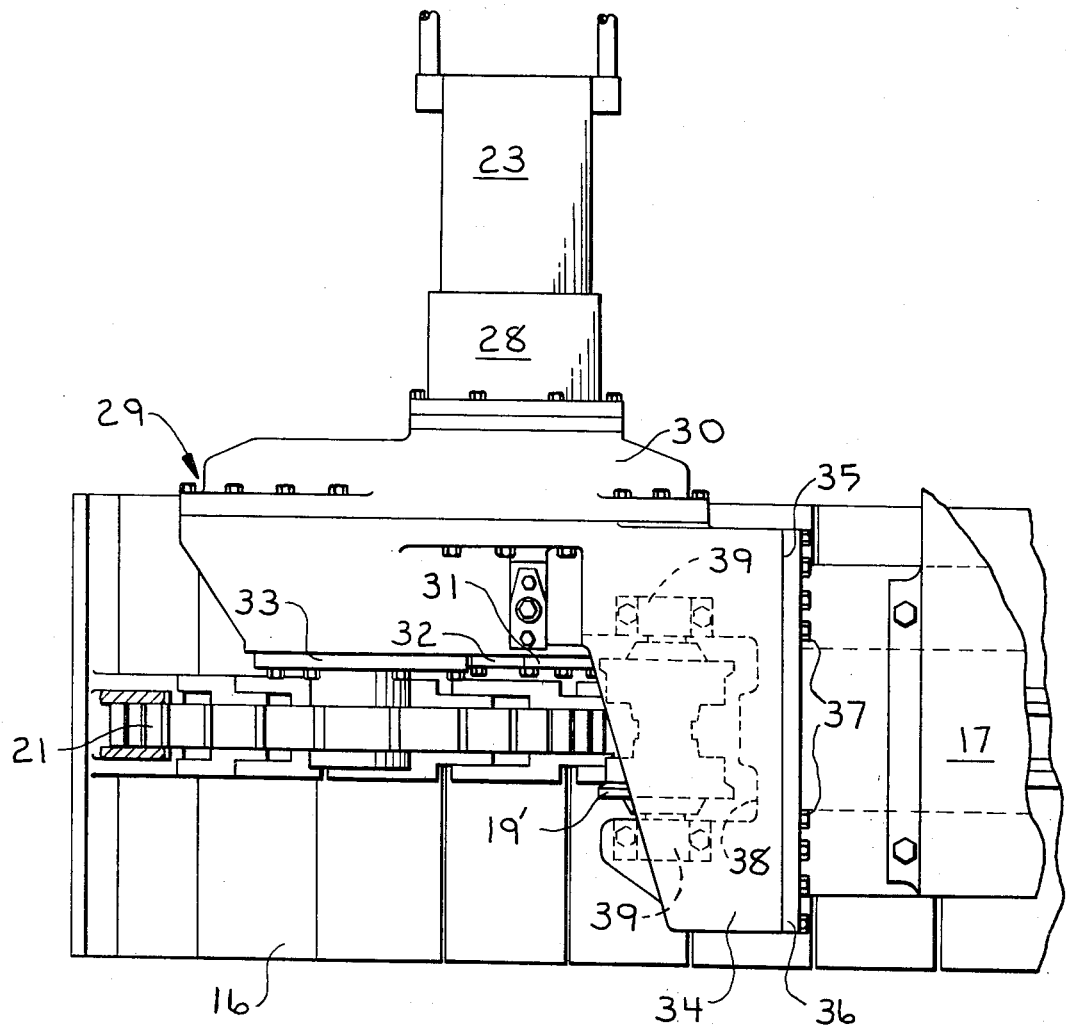
FIG. 2 is an enlarged, top plan view of the track drive and attendant support structures, taken in the direction of arrows II—II in FIG. 1, with a top portion of an endless track assembly removed therefrom for clarification purposes.
Figure 3:
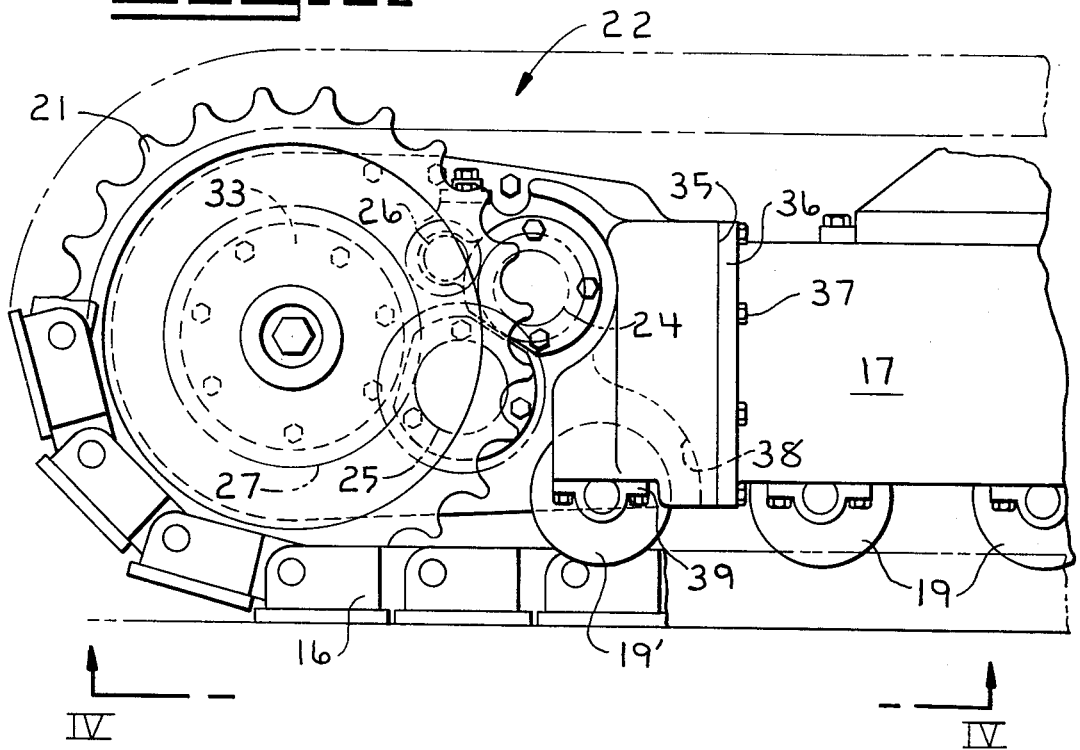
FIG. 3 is a side elevational view of the track drive.

As shown in FIGS. 2 and 3, the final track drive comprises a hydrostatic drive motor 23 arranged to drive sprocket 21 through a speed reduction gear train, illustrated by broken lines in FIG. 3. The gear train may comprise a pair of intermeshed cluster gears 24 and 25 drivingly interconnected between an input gear 26 and an output gear 27. The input gear is connected to the output shaft (not shown) of motor 23 through a normally engaged disc-type parking brake 28 whereas the output gear is drivingly connected to the sprocket.

The final drive further comprises a housing 29, having motor 23 and brake 28 mounted thereon, and which encloses and supports the reduction gear train. The housing comprises an inwardly disposed cover 30 and a plurality of bearing cages 31, 32 and 33 attached thereon which cooperate with cover 30 to respectively mount gears 24, 25 and 27 therebetween. The housing has an outwardly extending, tapered arm portion 34 having a broad mounting face 35 formed on the front side thereof. The housing is detachably mounted at forwardly disposed mounting face 35 to a flush, rearwardly disposed mounting flange 36 of track frame 17 by a plurality of fastening means, such as bolts 37.

Figure 4:
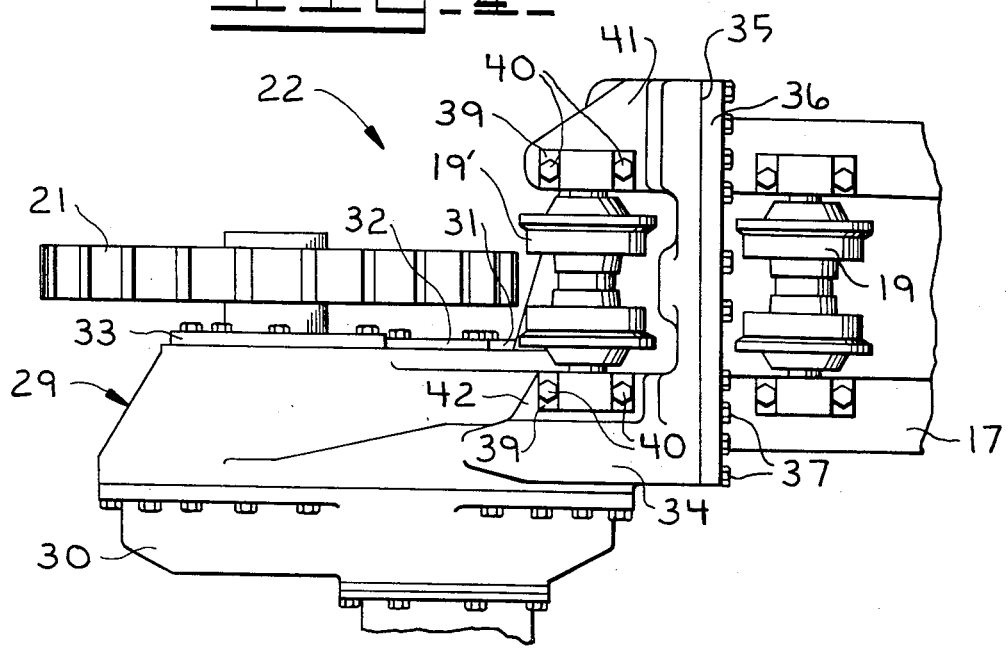
FIG. 4 is a bottom plan view of the track drive, taken in the direction of arrows IV—IV in FIG. 3, with the track assembly removed for clarification purposes.

The arm portion is contoured to define an arcuate cavity 38 (FIG. 3) for substantially accommodating a rearwardmost track roller 19' therein which is in substantial linear alignment with track rollers 19 (FIG. 1). As shown in FIG. 4, such track roller is attached beneath housing 29 by a pair of laterally spaced end caps 39, secured by bolts 40 to planar surfaces 41 and 42, formed on lower surface portions of arm 34. The disposition of arcuate cavity 38 with respect to the outer periphery of track roller 19' facilitates the location of sprocket 20 in close proximity to track frame 17.

Field servicing of final track drive 22 is accomplished by first removing track assembly 16 in a conventional manner. The modular final track drive, including housing 29, the reduction gear train, sprocket 21 and rearmost track roller 19', can then be removed as a unit from track frame 17 by solely removing bolts 37. The co-extensive contacting surface areas at the mounting means comprising mounting face 35 and flange 36 are sufficiently large to fully mask the rearward end of the track frame to fully secure the track drive to the track frame in a cantilevered manner while yet affording a high degree of structural integrity thereat.

Thus, the compactness of the final track drive facilitates its expeditious detachment and handling in the field in contrast to conventional final drives which are normally welded to a supporting track frame. Furthermore, housing 29 completely encloses the internal drive components thereof so that they are not exposed to dirt or possible damage when the final drive is so removed. Assembly line production methods are also facilitated since the final track drive can be tested prior to its installation on a vehicle.

While the invention has been described and shown with particular reference to the preferred embodiment, it will be apparent that variations might be possible that would fall within the scope of the present invention which is not intended to be limited, except as defined in the following claims.

What is claimed is:

1. A modular final drive in combination with a track-type vehicle having a track roller frame, said final drive comprising
    a housing,
    a gear train disposed within said housing,
    a track driving sprocket mounted on the housing and drivingly connected to said gear train,
    mounting means for detachably securing said housing to said track roller frame so that said housing, said gear train, and said sprocket can be removed as a unit from said track roller frame to allow independent servicing thereof and
    a track roller rotatably mounted on said housing in close proximity to said sprocket.

2. The invention of claim 1 wherein said mounting means comprises a forwardly disposed mounting face on said housing, a rearwardly disposed mounting flange secured on said track roller frame and fastening means, solely mounting said housing on said frame, removably attaching said mounting face in flush relationship on said mounting flange.

3. The invention of claim 1 wherein said housing includes an arm extending laterally across said sprocket and having means forming an arcuate cavity therein disposed in close proximity to said sprocket and wherein said track roller is mounted on said arm and is substantially disposed within said cavity.

4. The invention of claim 3 further comprising a plurality of additional track rollers mounted on said track roller frame in substantial linear alignment with the track roller mounted on said housing and a motor mounted on said housing and operatively connected to said gear train for selectively driving same.

5. In an undercarriage for a track-type vehicle comprising
    a track roller frame having a rearwardly-disposed mounting flange thereon,
    a modular final drive means enclosed in a housing having an outwardly extending arm and a forwardly-disposed mounting face formed on said arm, said mounting face and mounting flange being at least substantially co-extensive with respect to each other,
    fastening means for removably securing said housing on said track roller frame by maintaining said mounting face and said mounting flange in close intimate contact with each other so that said modular final drive means can be selectively removed as a unit from said track roller frame, and
    a track roller rotatably mounted on said housing in close proximity to said sprocket.

6. The invention of claim 5 wherein said drive means comprises a track driving sprocket rotatably mounted on said housing and wherein said arm has means defining an arcuate cavity therein disposed in close proximity to said sprocket, said track roller substantially disposed within said cavity.

7. A track-type vehicle disposed for movement along a longitudinal axis thereof comprising
    a pair of laterally spaced and parallel track assemblies extending in the direction of said axis,
    a frame supporting each of said track assemblies, and
    modular final drive means for selectively driving each one of said track assemblies, said final drive means comprising
    a housing detachably mounted on a rearward end of a respective one of said frames by mounting means, said mounting means comprising a forwardly disposed mounting face on said housing, a rearwardly disposed mounting flange secured on said frame and fastening means, solely mounting said housing on said frame, removably attaching said mounting face in flush relationship on said mounting flange,
    motor means mounted said housing, rearwardly of said frame,
    a speed reduction gear train entirely mounted in said housing and operatively connected to said motor means to be driven thereby, and
    a drive sprocket mounted on said housing and operatively connected to said gear train and to a respective one of said tracks.

8. The invention of claim 7 wherein said track-type vehicle constitutes an excavator having an upper unit rotatably mounted on an undercarriage comprising said track assemblies and said frame.

* * * * *